(12) United States Patent
Critchfield (10) Patent No.: US 10,082,776 B2
(45) Date of Patent: Sep. 25, 2018

(54) METHOD AND APPARATUS FOR AUTOMATED GENERATION AND SEWING OF A BORDER PATTERN

(71) Applicant: Gracewood Management, Inc., West Valley City, UT (US)

(72) Inventor: Bradley B. Critchfield, West Valley City, UT (US)

(73) Assignee: Gracewood Management, Inc., West Valley City, UT (US)

( * ) Notice: Subject to any disclaimer, the term of this patent is extended or adjusted under 35 U.S.C. 154(b) by 305 days.

(21) Appl. No.: 15/089,473

(22) Filed: Apr. 2, 2016

(65) Prior Publication Data

US 2017/0285593 A1    Oct. 5, 2017

(51) Int. Cl.
| | |
|---|---|
| G05B 19/02 | (2006.01) |
| D05B 19/16 | (2006.01) |
| G06F 3/0482 | (2013.01) |
| G06F 3/0484 | (2013.01) |

(52) U.S. Cl.
CPC .............. *G05B 19/02* (2013.01); *D05B 19/16* (2013.01); *G06F 3/0482* (2013.01); *G06F 3/04847* (2013.01)

(58) Field of Classification Search
CPC ........ D05B 19/16; D05B 19/12; D05B 19/00; D05B 19/08; D05B 19/10; D05B 35/102; D05B 21/00
USPC ...... 112/470, 470.1, 470.04, 470.06, 470.07, 112/470.09, 470.11, 117, 118; 700/136, 700/131, 135, 137, 138
See application file for complete search history.

(56) References Cited

U.S. PATENT DOCUMENTS

| | | | |
|---|---|---|---|
| 4,953,483 A * | 9/1990 | Brower | D05B 11/00 112/119 |
| 4,953,485 A | 9/1990 | Brower et al. | |
| 5,095,835 A | 3/1992 | Jernigan et al. | |
| 5,537,946 A | 7/1996 | Sadeh et al. | |
| 5,544,599 A | 8/1996 | Frazer et al. | |
| 6,167,822 B1 * | 1/2001 | Miyasako | D05B 19/006 112/102.5 |
| 6,216,619 B1 | 4/2001 | Musco et al. | |
| 6,237,517 B1 | 5/2001 | Bondanza et al. | |
| 6,263,816 B1 | 7/2001 | Codos et al. | |
| 6,357,370 B1 * | 3/2002 | Fritz | A41H 3/06 112/117 |
| 6,367,397 B1 | 4/2002 | Musco et al. | |
| 6,435,117 B2 | 8/2002 | Codos et al. | |
| 6,755,141 B2 | 6/2004 | Musco et al. | |
| 6,796,254 B2 | 9/2004 | Bondaza et al. | |
| 6,848,846 B2 | 2/2005 | Codos et al. | |

(Continued)

*Primary Examiner* — Danny Worrell
*Assistant Examiner* — Griffin Hall
(74) *Attorney, Agent, or Firm* — J. David Nelson (57) ABSTRACT

A method and apparatus for automated assisted generation, by a user, of a digitized border pattern for a border zone of a fabric article, and automated assisted sewing of the digitized border pattern, the border pattern incorporating a plurality of border pattern segments having one or more pattern lines, the actuator displaying the border zone to the user, presenting available digitized border pattern segments to the user for selection, positioning, orienting, scaling, and selective interconnecting, by the user through interaction with the actuator, for integration of the selected border pattern segments into the digitized border pattern.

17 Claims, 8 Drawing Sheets

(56) References Cited

U.S. PATENT DOCUMENTS

| | | | |
|---|---|---|---|
| 7,063,028 B2 | 6/2006 | Codos et al. | |
| 7,383,640 B2 * | 6/2008 | Barry | D05B 11/00 33/1 G |
| 8,074,590 B2 | 12/2011 | Bentley | |
| 8,087,368 B2 | 1/2012 | Raimondo | |
| 8,515,571 B1 | 8/2013 | Bagley | |
| 8,528,491 B2 | 9/2013 | Bentley | |
| 8,967,062 B1 * | 3/2015 | Gardner | D05B 19/12 112/475.19 |
| 9,284,670 B2 * | 3/2016 | Schwarzberger | D05B 11/00 |
| 2001/0052312 A1 | 12/2001 | Codos et al. | |
| 2006/0213417 A1 | 9/2006 | Codos et al. | |
| 2009/0151612 A1 | 6/2009 | Bentley | |
| 2011/0005441 A1 | 1/2011 | Roche | |
| 2011/0190922 A1 | 8/2011 | Walker et al. | |
| 2016/0160414 A1 * | 6/2016 | Oda | D05B 19/08 112/470.07 |

* cited by examiner

METHOD AND APPARATUS FOR AUTOMATED GENERATION AND SEWING OF A BORDER PATTERN

BACKGROUND OF THE INVENTION

The present invention is in the field of methods and apparatuses for automated pattern sewing, and in particular in the field of method and apparatuses for the automated generation and sewing of integrated border patterns for quilts and other fabric articles. In this specification, including the claims, the term "fabric article" shall be defined to mean a quilt, which is to be sewn from two or more layers of fabric, or other sewing article, such as an embroidery article, which is to be sewn from one or more layers of fabric.

Automated quilting has become increasingly popular because it allows persons to quilt who lack the time, skill, physical ability, or patience to quilt by hand. Mechanized sewing frames, including quilting frames, provide for a sewing machine to be mounted on a sewing machine carriage which is movably mounted on the quilting frame or other sewing frame. The sewing machine carriage typically has a pair of carriage motors, each motor being connected to a gear box which is connected to a carriage drive mechanism. The carriage drive mechanism interacts with the quilting frame or other sewing frame, thereby providing for the two dimensional, x-y, horizontal movement for the sewing machine carriage and the sewing machine mounted thereon. This x-y horizontal movement of the sewing machine provides for the automated positioning of the sewing machine for the automated sewing of a pattern. The fabric layers being quilted are typically held between a pair of fabric rails, a feed rail and a take up rail, the take up rail passing through the throat of the sewing machine and the feed rail being positioned outside the throat of the sewing machine. The two fabric rails provide for the linear positioning and positioning of the fabric and for maintaining a desired tension on the fabric as the sewing machine is moved in the x and y dimensions and sews a desired pattern.

Automated quilting systems typically use a digitized pattern which is selected by the user. The digitized pattern is stored and implemented by an actuator, typically a digital computer, which may be an integral part of the automated quilting system. Typically the sewing machine and hence the needle bar, have to be initially manually positioned with respect to the fabric in accordance with the sewing pattern, and then the actuator causes the sewing machine to move in accordance with the pattern and to sew the selected pattern as the sewing machine is moved. In order to provide for the automated sewing of a sewing pattern on a quilt or other fabric article that would otherwise be too large for sewing on a typical quilting or other sewing frame and sewing machine apparatus, the method and apparatus of U.S. Pat. No. 8,515,571 to Bagley, the present inventor, provides for the automated segmental sewing of over-sized sewing patterns.

In the interest of appearance, creativity, and durability, most users of automated quilting systems, as well as persons quilting by hand, prefer to have a border on the quilt. A border is typically a strip or zone of fabric which extends around the periphery of the quilt and is sewn with a border pattern, which is different from the pattern used for the sewing of the quilt central zone. A quilt may have more than one border strip or zone, each of which may have a different border pattern.

Sewing enthusiasts may also desire to sew border patterns for other types of fabric articles, such as an embroidery articles. Sewing of patterns with mechanized frames, as described above for quilts, which typically have two or more fabric layers, may be accomplished for other types of fabric articles, including single fabric layer embroidery articles. The term "sewing frame" shall be defined to include, for the purposes of this specification including the claims, those fabric positioning and automated sewing machine positioning mechanisms known to persons of skill in the art to be included within the normal industry definition for the terms "quilting frame" or "sewing frame", as well as other frames and fabric positioning and sewing machine control mechanisms which provide for positioning and for automated pattern sewing of the typical two or more fabric layers for a quilt, the typical single layer for an embroidery article, or the one or more layers for other fabric articles.

It is an objective of the present invention to provide a method and apparatus for a fabric article that will provide for a user to select or identify border characteristics, including length, width, position with respect to the quilt outer edge, the existence or non-existence of a peripheral zone, and the dimensions of the peripheral zone; will provide for the user to review pattern segments that are available for incorporation into a border pattern; and will provide for the user to select, determine the respective quantities, orient and position the border pattern segments that the user wishes to incorporate in the overall border pattern; and will provide for the sizing (scaling) and fitting of the selected border pattern segments with respect to the border zone, and for the optional interconnection of the selected, positioned, oriented and scaled border pattern segments as desired by the user.

It is a further objective of the present invention to provide a method and apparatus for generating and sewing a digitized border pattern for a fabric article, the border pattern being comprised of a plurality of digitized border pattern segments which may be selected by the user through the use of a digital display of the available pattern segments from a digital pattern segment library; and may be positioned, oriented and scaled by the user, in respective quantities selected by the user, in a border zone dimensioned and positioned by the user near the perimeter of the fabric article.

It is a further objective of the present invention to provide a method and apparatus for generating and sewing a digitized border pattern for a quilt or another fabric article which provides for the end lines of some or all of the border pattern segments, as selected by the user, to be connected to the end lines of respective adjacent border pattern segments in a manner selected by a user from inter-connection options generated and displayed to the user, which inter-connection options may include truncating one or both of the pattern segment end lines that are to be connected.

It is a further objective of the present invention to provide a method and apparatus for a user to select or identify border characteristics, including length, width, and position with respect to the quilt outer edge, i.e. the existence or non-existence of a peripheral zone; for the user to review pattern segments that are available for incorporation into a border pattern; and for the user to select and position the border pattern segments in respective quantities selected by the user, that the user wishes to incorporate in the overall border pattern.

It is a further objective of the present invention to provide a method and apparatus for generating and sewing a digitized border pattern for a quilt or another fabric article, which provides for the segmental sewing of the border pattern.

SUMMARY OF THE INVENTION

A quilt or other fabric article has a fabric article periphery and may have a border zone which extends completely or partially around the fabric article. The border zone may be positioned inside a peripheral zone which may also extend completely or partially around the fabric article. For a preferred embodiment of the method and apparatus of the present invention, the user may initially be prompted by an actuator, which may be a digital computer or an integrated computer system, to input fabric article data, such as dimensions. Based upon the initial fabric article data input by the user as prompted by the actuator, digitized fabric article coordinates are determined by the actuator.

Through interaction with the actuator, border pattern segments selected by the user are positioned as selected by the user within the border pattern zone. After the border zone and the border pattern zone have been digitized by the actuator, based upon input data and choices by the user, the user may be prompted to examine, on a computer screen, monitor, or other electronic display device, pattern segments which are stored in the actuator or are otherwise accessible to the actuator by link to a digital pattern segment data base. Typical border pattern segments may include border pattern segments that are specifically adapted for use as corner pattern segments.

Through interaction with the actuator, the user may select and position the border pattern segments which the actuator may initially orient based on the position designated by the user in the border pattern zone. Based upon input from the user, the actuator may adjust the size (i.e. scale) of any or all of the border pattern segments to fit all or a portion of the border pattern segments in the border pattern zone. The border pattern segments selected, positioned and scaled by the user through interaction with the actuator may be displayed to the user on a computer screen, monitor, or other electronic display device.

Upon viewing the display of the selected, positioned and scaled border pattern segments, the user may alter the border pattern segment selections, the number of the respective selected border pattern segments, the scale, or the positioning of the selected border pattern segments through interaction with the actuator. Also, through interaction with the actuator, the user may reorient the selected pattern segments which have been positioned in the border pattern zone. The reoriented pattern segments may be mirror or reflected images or may be rotated as desired by the user. The pattern segments selected, positioned and oriented by the user through interaction with the actuator, and scaled by the actuator based upon input by the user, may be displayed to the user by the actuator, which includes the border pattern segments and the reoriented border pattern segments.

Preferred embodiments of the method and apparatus of the present invention may provide for the generation of a continuous border pattern extending continuously around the border zone, for the ease of sewing and improved appearance. Alternatively, some of the border pattern segments may the interconnected with adjacent border pattern segments, while other border pattern segments are not interconnected with one or both of the adjacent border pattern segments. A continuous border zone pattern or partially interconnected border pattern segments, requires that the end lines of adjacent border pattern segments be interconnected. Typically the pattern segment interconnection options may include alternative interconnecting lines with adjustable curves or splines of varying curvature. The user may accept one of the interconnection options displayed or may, by interaction with the actuator, cause the actuator to compute and display additional interconnection lines alternatives. Some of the interconnection line alternatives include alternatives for truncating either or both of the pattern segment end lines which are being interconnected by the interconnection lines alternatives. The truncation of one or more of the respective end lines that are being interconnected may result in a smoother and more visually appealing continuous or partially interconnected border zone pattern.

The actuator displays to the user the final border pattern, which is the result of the border pattern segments selected by the user in respective quantities selected by the user, positioned as selected by the user, oriented as selected by the user, scaled as selected by the user, and interconnected as selected by the user, through interaction of the user with the actuator. The user may revise any or all of the foregoing selections at any time through interaction with the actuator.

The method and apparatus of the present invention provide for the sewing of the final stitching border pattern in consecutive border zone portions. For each border zone portion, the fabric of the border zone portion is positioned on the sewing frame, and border zone position data for the border zone portion is detected by a position detection mechanism which is used to detect the position of a plurality of border reference points of the border zone portion and actuator provides for the border reference points to be digitized. The sewing end points are detected by a position detection mechanism for each previously sewed border zone portion which is adjacent to the present border zone portion, and those sewing end points are digitized. The border stitching pattern for the present border zone portion is adjusted to fit the sewing start points of the present border zone portion to the sewing end points of the previously sewed border zone portions which are adjacent to the present border zone portion. The adjusted border stitching pattern of the border zone portion is then sewed.

Preferred embodiments of the method and apparatus of the present invention may provide for the user to alter or revise the final border pattern, including border pattern segment selections, respective quantities of selected border pattern segments, border pattern segment positioning, pattern segment orientations, scaling of border pattern segments, fitting of border pattern segments to border zones, and pattern segment interconnections of adjacent border pattern segments at any time prior to stitching.

DETAILED DESCRIPTION

Figure 1:
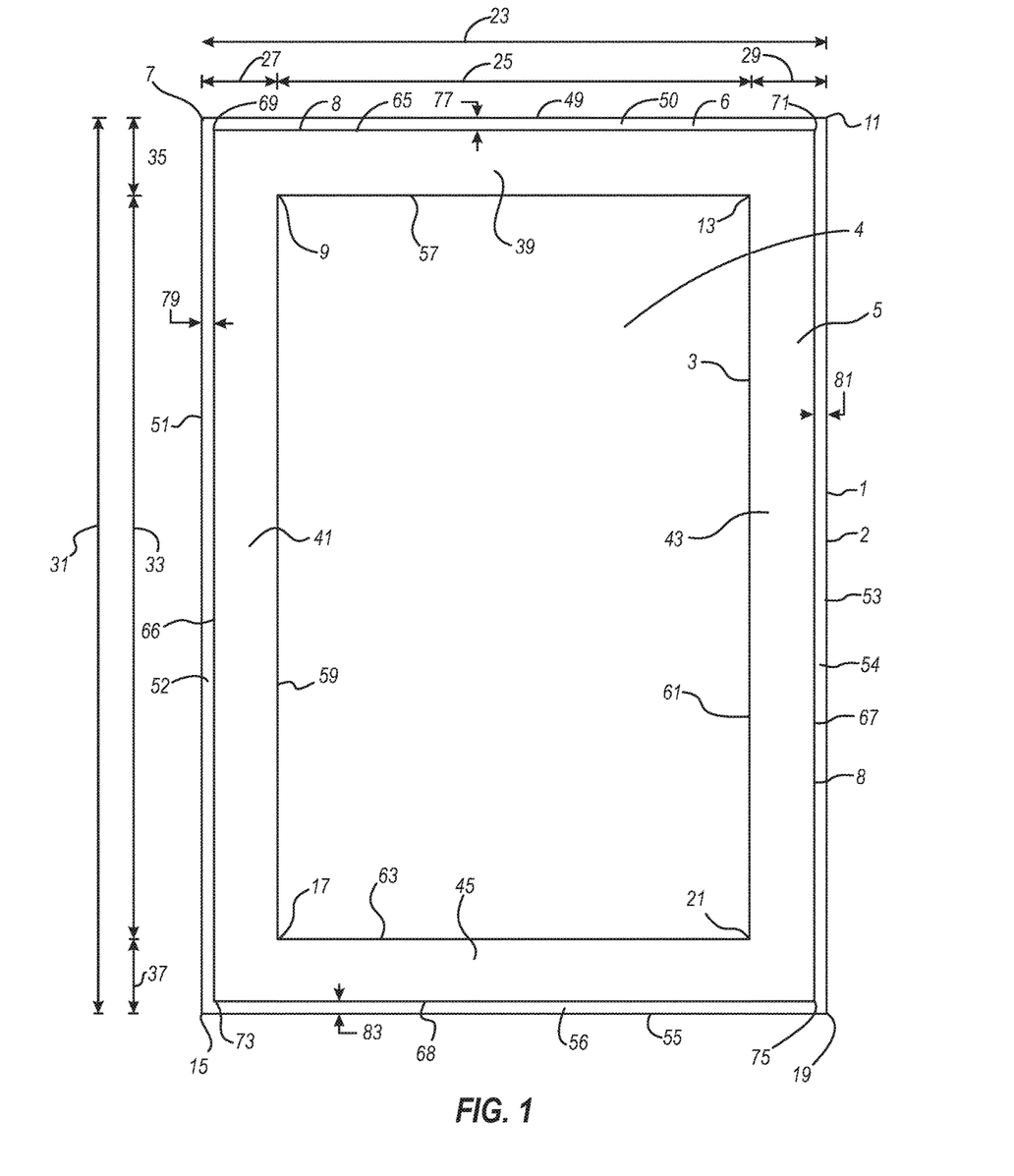
FIG. 1 is a plan view of a typical layout for a fabric article having a central zone, a border zone, and a peripheral zone, which fabric article may be the subject of the method and apparatus of the present invention.

Referring first to FIG. 1, a plan view of a layout for a rectangular embodiment of a fabric article 1 is shown. The fabric article periphery 2 is comprised of a top periphery 49, a left periphery 51, a right periphery 53, and a bottom periphery 55. While the embodiment shown has a peripheral zone 6 extending completely around the fabric article periphery 2 of the fabric article 1 that is comprised of a top periphery zone 50, a left periphery zone 52, a right periphery zone 54, and a bottom periphery zone 56, which may typically be a plain fabric without pattern stitching and comprised of an accent or a complementary color, portions of the periphery zone may be eliminated, for example, on both sides while being maintained on the top and bottom.

For the fabric article 1 illustrated in FIG. 1, a border zone 5 extends completely around the fabric article 1 inside a continuous peripheral zone 6. For embodiments having no peripheral zone 6, or a partial peripheral zone, the border zone 5 would extend to the fabric article periphery 2 at all points where there is no peripheral zone 6. For the embodiment shown, the border zone 5 is comprised of a top border zone 39, a left border zone 41, a right border zone 43 and a bottom border zone 45. The border zone 5 is formed by the outside border line 8 and the inside border line 3. For the embodiment shown, the outside border line 8 includes a top outside border line 65, a left outside border line 66, a right outside border line 67, and a bottom outside border line 68. For fabric article layouts not having a peripheral zone 6 on all sides of the layout, at points where there is no peripheral zone, the outside border line 8 aligns with the fabric article periphery 2. The inside border line 3, which for the embodiment shown includes a top inside border line 57, a left inside border line 59, a right inside border line 61, and a bottom inside border line 63, serves as an inside boundary of the border zone 5 and an outside boundary of the central zone 4.

For a preferred embodiment of the method and apparatus of the present invention, the user may initially be prompted by an actuator, which may be a digital computer or an integrated computer system, to input fabric article data. The fabric article data that the user may be prompted to input, typically by keyboard or touchscreen, may include fabric article width 23, fabric article length 31, top peripheral zone width 77, left peripheral zone width 79, right peripheral zone width 81, bottom zone peripheral zone width 83, top border zone width 35, left border zone width 27, right border zone width 29, and bottom border zone width 37. For other embodiments, the actuator may provide for the user to input additional fabric article data values for other fabric article variables such as outside margin zone width 105 and an inside margin zone width 106. Alternatively, the actuator may provide for the user to input fewer fabric article data values and for values of non-input variables to be suggested and displayed to the user, based upon input fabric article data. Based upon the initial fabric article data input by the user as prompted by the actuator, digitized fabric article coordinates are determined by the actuator, which may typically include top left fabric article corner coordinate 7, top right fabric article coordinate 11, bottom left fabric article corner coordinate 15, bottom right fabric article corner coordinate 19, top left peripheral zone coordinate 69, top right peripheral zone coordinate 71, bottom left peripheral zone coordinate 73, bottom right peripheral zone coordinate 75, top left border zone coordinate 9, top right border zone coordinate 13, bottom left border zone coordinate 17, and bottom right border zone coordinate 21. Central zone width 25 and central zone length 33 may also be determined by the actuator from the input data.

Figure 2:
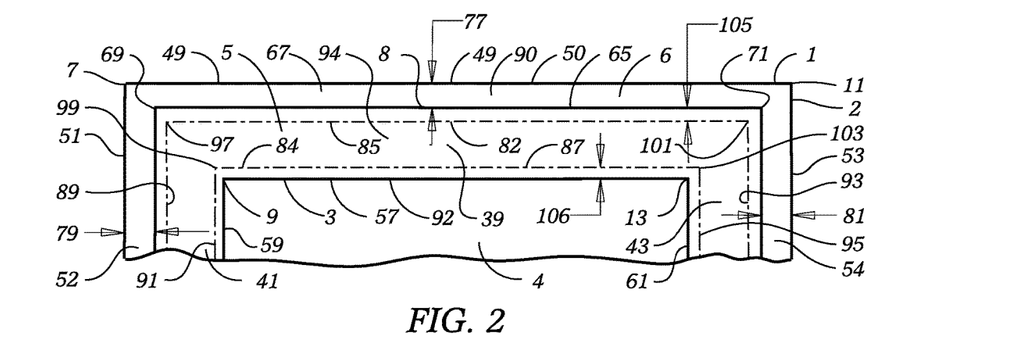
FIG. 2 is a plan view detail of a top portion of a layout for a fabric article, which may be the subject of the method and apparatus of the present invention, showing fabric article periphery, peripheral zone, outside border line, border zone, inside border line, outside margin zone, outside margin line, border pattern zone, inside margin line, inside margin zone, and central zone.
Figure 3:
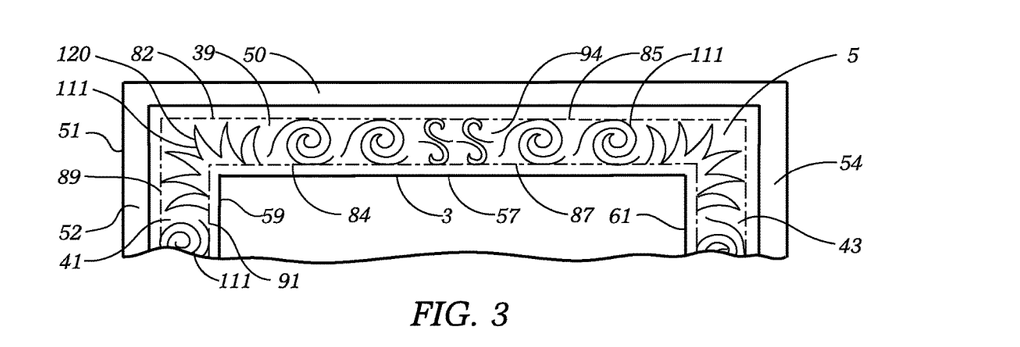
FIG. 3 is a plan view detail of a top portion of a layout for a fabric article, which may be the subject of the method and apparatus of the present invention as shown in FIG. 2, with border pattern segments selected by the user and positioned as selected by the user within the border pattern zone.
Figure 4:
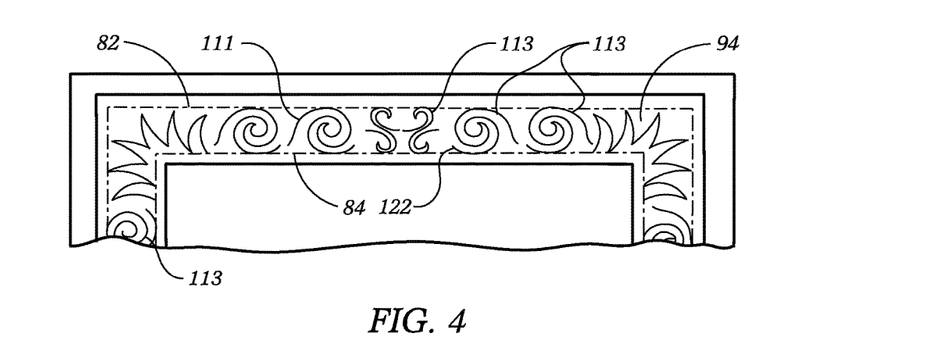
FIG. 4 is a plan view detail of a top portion of a layout for a fabric article, which may be the subject of the method and apparatus of the present invention as shown in FIG. 3 with border pattern segments selected by the user, positioned as selected by the user within the border pattern zone, and oriented by the user.
Figure 5:
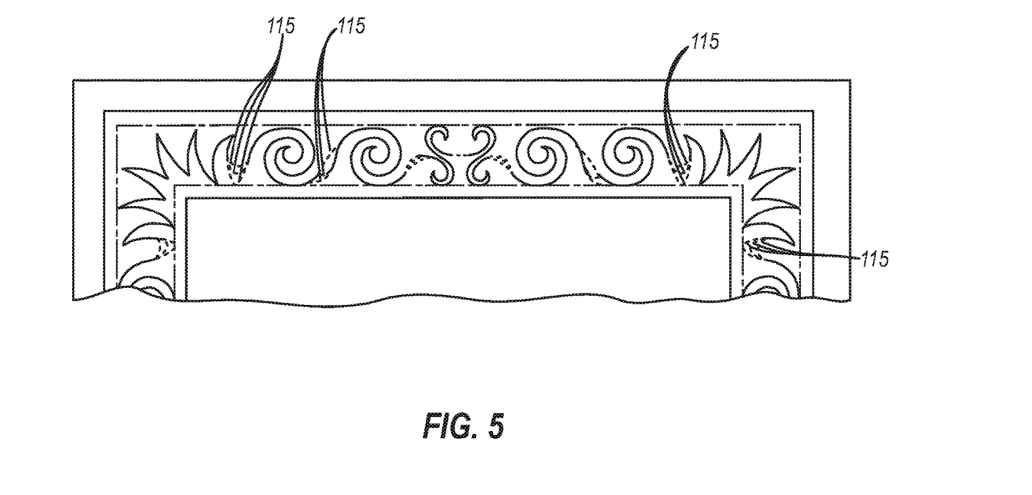
FIG. 5 is a plan view detail of a top portion of a layout for a fabric article, which may be the subject of the method and apparatus of the present invention as shown in FIG. 4 with border pattern segments selected by the user, positioned as selected by the user within the border pattern zone, and oriented by the user, with pattern segment interconnection options for connecting the end lines of adjacent border pattern segments shown, including options for truncating portions of interconnected pattern segment end lines.

Referring now to FIG. 2, a plan view detail of a layout of a top portion of a fabric article 1, such as that illustrated in FIG. 1, that may be the subject of the method and apparatus of the present invention. The fabric article periphery 2, peripheral zone 6, outside border line 8, border zone 5, inside border line 3, outside margin zone 90, outside margin line 82, border pattern zone 94, inside margin line 84, inside margin zone 92, and central zone 4 are shown. The actuator may prompt the user to decide whether the user wishes to establish an outside margin zone 90 for the border zone 5, adjacent to the outside border line 8, and an inside margin zone 92 for the border zone 5 which is adjacent to the inside border line 3. If the user elects to establish an outside margin zone 90 and an inside margin zone 92, the user may elect to have the actuator position border pattern segments 111 as shown in FIGS. 3-5 between the top outside margin line 85 and the top inside margin line 87, between the left outside margin line 89 and the left inside margin line 91, between the right outside margin line 93 and the right inside margin line 95, and between a bottom outside margin line and a bottom inside margin line similarly positioned within the border zone 5 but not shown in FIGS. 2-5. The outside margin line 82 and the inside margin line 84 may serve as boundary lines, i.e. outside and inside position limits for the border pattern segments 111 as shown in FIGS. 3-5. Alternatively, the outside margin line 82 and the inside margin line 84 may serve merely as guides or reference lines for the positioning of border pattern segments 111 with respect to the border zone 5.

The user may be further prompted by the actuator to input an outside margin zone width 105 and an inside margin zone width 106. This provides for the determination by the actuator of digitized coordinates which define the border pattern zone 94, including pattern zone outside top left coordinate 97, pattern zone outside top right coordinate 101, pattern zone inside top left coordinate 99, pattern zone inside top right coordinate 103, and corresponding coordinates for the bottom portion of the fabric article 1 not shown in FIG. 2. The border pattern zone 94 may then be defined by the top outside margin line 85, top inside margin line 87, left outside margin line 89, left inside margin line 91, right outside margin line 93, right inside margin line 95, and corresponding coordinates in the bottom portion of the fabric article 1 not shown in FIG. 2.

For the preferred embodiment of the method of the present invention illustrated in FIG. 2, the outside margin zone 90 is shown with the uniform width 105 for the top, bottom, left and right portions of the outside margin zone 90. Similarly for the embodiment shown, the inside margin zone 92 is shown having a uniform inside margin zone width 106 for the top, bottom, left and right portions of the inside margin zone 92. However the user may be prompted by the actuator to input whether the user wishes to select a uniform margin zone width for both the outside margin zone 90 and the inside margin zone 92, wishes to select a different outside margin zone width 105 and a different inside margin zone width 106; or wishes to establish a different margin zone width for different portions of the outside margin zone 90 or the inside margin zone 92. Of course, the user may also elect to eliminate any or all portions of the outside margin zone 90, as well as any or all portions of the inside margin zone 92.

Referring now to FIG. 3, a plan view is shown of the top portion of a fabric article 1 layout that may be the subject of the method and apparatus of the present invention as shown in FIG. 2, with border pattern segments 111 selected by the user positioned as selected by the user within the border pattern zone 94. After the border zone 5 and the border pattern zone 94 have been digitized by the actuator, based upon input data and choices by the user, the user may be prompted to examine, on a computer screen, monitor, or other electronic display device, pattern segments which are stored in the actuator or are otherwise accessible to the actuator by link to a digital pattern segment data base. Typical border pattern segments 111 are illustrated in FIG. 3, which may include border pattern segments 111 that are specifically adapted for use as corner pattern segments 120. Through interaction with the actuator, the user may select and position the border pattern segments 111 which the actuator may initially orient based on the position designated by the user in the border pattern zone 94. Based upon input from the user, the actuator may adjust the size (i.e. scale) of each of the border pattern segments 111 to fit all or a portion of the border pattern segments 111 in the border pattern zone 94 as shown in FIG. 3. The border pattern segments 111 selected and positioned by the user through interaction with the actuator may be displayed to the user on a computer screen, monitor, or other electronic display device. Upon viewing the display of the selected and positioned border pattern segments 111, the user may alter the border pattern segment 111 selections, the number of the respective selected border pattern segments 111 or the positioning of the selected border pattern segments 111 through interaction with the actuator.

Referring now to FIG. 4, through interaction with the actuator, the user may reorient the selected pattern segments which have been positioned and scaled in the border pattern zone 94. The reoriented pattern segments 113 may be mirror or reflected images or may be rotated as desired by the user. The pattern segments 111 selected, positioned and oriented by the user through interaction with the actuator, and scaled by the actuator based upon input by the user, may be displayed to the user by the actuator as shown in FIG. 4, which includes the border pattern segments 111 and the reoriented border pattern segments 113. Preferred embodiments of the method and apparatus of the present invention may provide for the generation of a continuous border pattern extending continuously around the border zone 5, for the ease of sewing and improved appearance. Alternatively, some of the border pattern segments 111 may the interconnected with adjacent border pattern segments 111, while other border pattern segments 111 are not interconnected with one or both of the adjacent border pattern segments 111. The development of a continuous border zone pattern or partially interconnected border pattern segments 111, requires that the end lines 122 of adjacent border pattern segments 111 be interconnected.

Referring now to FIG. 5, three alternative interconnection lines 115 are shown for each pair of adjacent border pattern segments 111. Although three alternatives for the interconnecting lines 115 are shown in FIG. 5, the actuator may provide a larger or a smaller number of alternative interconnection lines 115. The options for interconnection lines 115 may be displayed by the actuator to the user. Typically the pattern segment interconnection options may include alternative interconnecting lines 115 with adjustable curves or splines of varying curvature.

The user may accept one of the interconnection options displayed or may, by interaction with the actuator, cause the actuator to compute and display additional interconnection lines alternatives 115. It will be noted that some of the interconnection line alternatives 115 include alternatives for truncating either or both of the pattern segment end lines 122 which are being interconnected by the interconnection lines alternatives 115. The truncation of one or more of the respective end lines 122 that are being interconnected may result in a smoother and more visually appealing continuous or partially interconnected border zone pattern.

Figure 6:
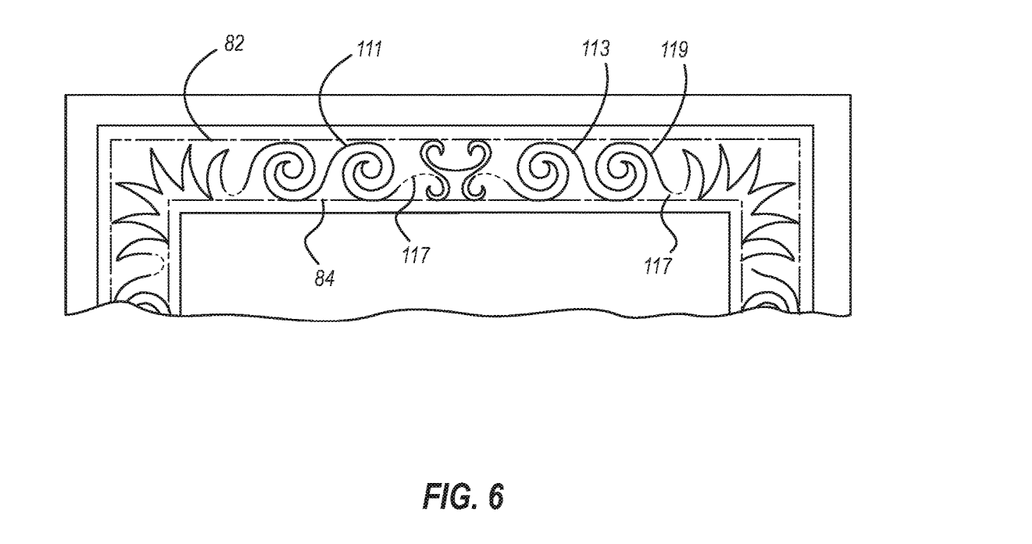
FIG. 6 is a plan view detail of a top portion of a layout for a fabric article, which may be the subject of the method and apparatus of the present invention as shown in FIG. 5 with the pattern segment interconnections, including the end line truncations, selected by the user being shown.
Figure 7:
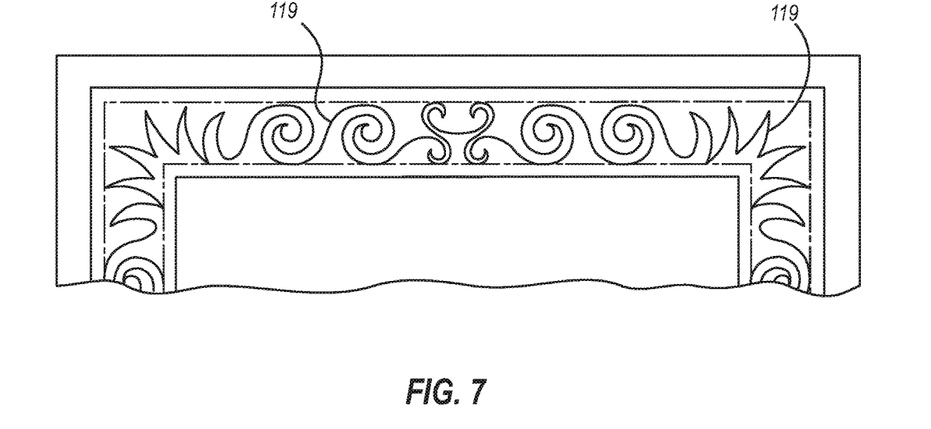
FIG. 7 is a plan view detail of a top portion of a layout for a fabric article, which may be the subject of the method and apparatus of the present invention as shown in FIG. 6 showing the final border pattern with interconnected border pattern segments as selected by the user.

Referring now to FIG. 6, from the interconnection line alternatives 115 shown in FIG. 5, the selected interconnection alternative 117 between the end lines 122 of respective adjacent patterns segments 111, as selected by the user is shown in FIG. 6. The border pattern segments 111 selected by the user, including the reoriented pattern segments 113 reoriented as selected by the user, with interconnection alternatives 117 selected by the user are shown in FIG. 6. For the alternative shown, the resultant border pattern 119 is shown in FIG. 7, which is rendered a continuous final border pattern 119 by the pattern segment interconnections 117 shown in FIG. 6.

Referring again to FIG. 7, the actuator displays to the user the final border pattern 119 which is the result of the border pattern segments 111 selected by the user in respective quantities selected by the user, positioned as selected by the user, oriented as selected by the user, scaled as selected by the user, and interconnected as selected by the user, through interaction of the user with the actuator. The user may revise any or all of the foregoing selections at any time through interaction with the actuator.

Figure 8:
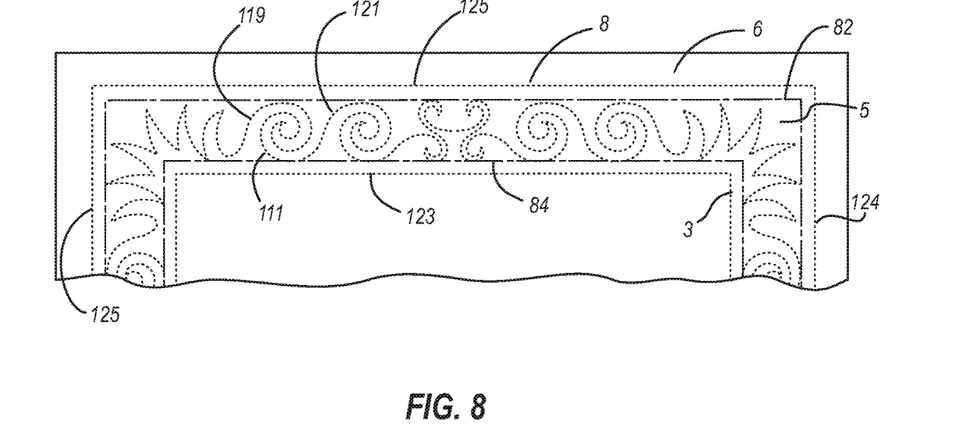
FIG. 8 is a plan view detail of a top portion of a layout for a fabric article, which may be the subject of the method and apparatus of the present invention as shown in FIG. 7 showing the border pattern as stitched, the peripheral zone line as stitched, and the border zone line as stitched.
Figure 9:
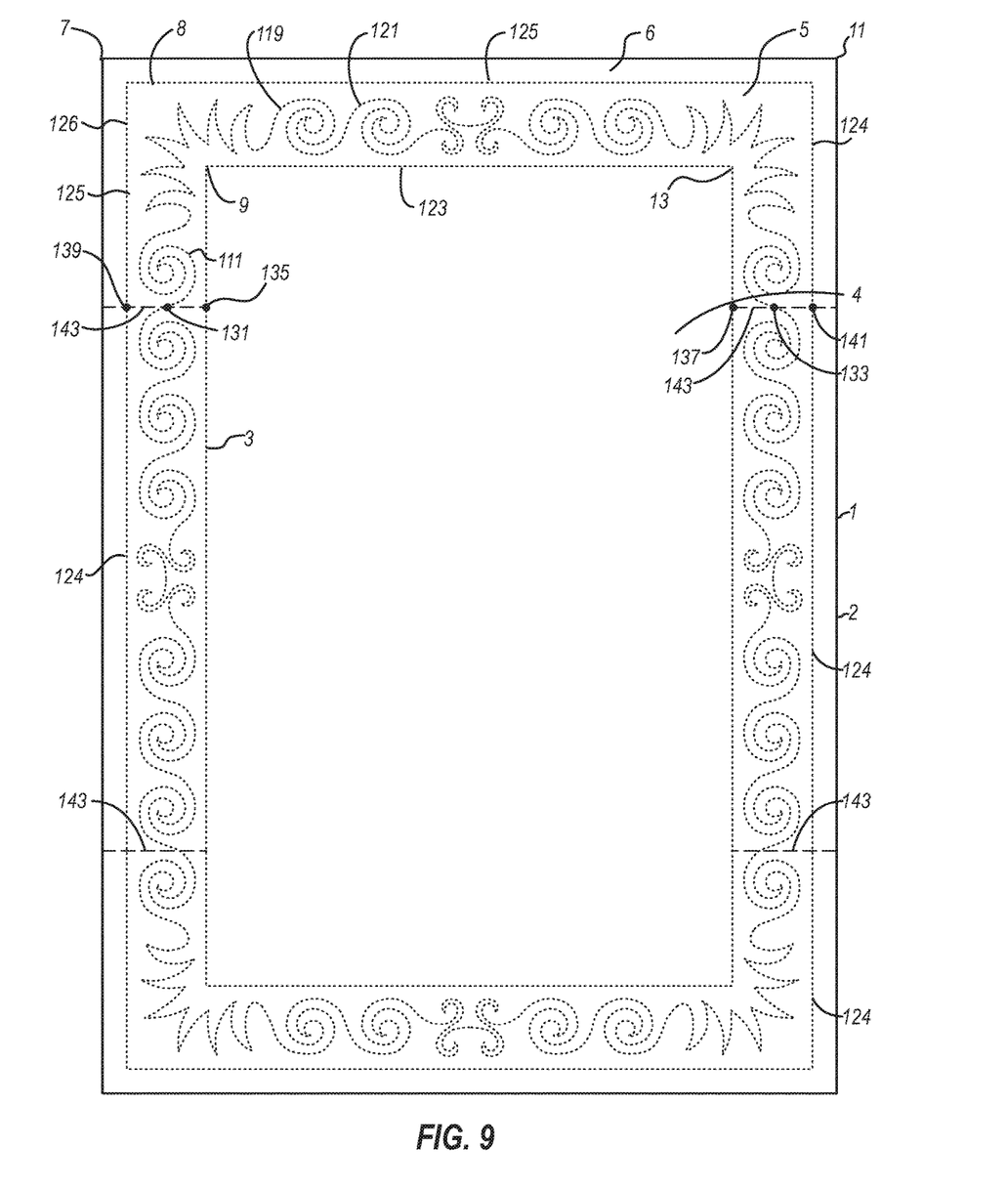
FIG. 9 is a plan view of a fabric article which is the subject of the method and apparatus of the present invention having the border pattern, the peripheral zone line and the border zone line stitched as selected by the user using the method and apparatus of the present invention.

Referring now to FIG. 8, a display is illustrated that the actuator may provide to the user to indicate the final border stitching pattern 121 of the final border pattern 119, which may be a continuous border pattern as shown in FIG. 8, or may have one or more respective discontinuities in the pattern between respective adjacent border pattern segments 111. If desired and selected by the user, the final border stitching pattern 121 may include inside border line stitching 123 along the inside border line 3 or outside border line stitching 125 along the outside border line 8, or both. Alternatively, the user may elect not to include inside border line stitching 123 or outside border line stitching 125 in the final border stitching pattern 121 of the final border pattern 119. Referring also to FIG. 9, the final border stitching pattern 121 of the final border pattern 119 for the total fabric article 1, which may be displayed by the actuator to the user for use by the user in making a final confirmation of the pattern, is shown.

Referring further to FIG. 9, commencement of the sewing of the final border stitching pattern 121 may be initiated by positioning a border zone portion 124, namely a first border zone portion 126, of the unsewn fabric article 1, on a sewing frame and using a position detection mechanism to detect the position of at least two border reference points on the first border zone portion 126 of the unsewn fabric article 1, the border reference points being selected and located by the user on the first border zone portion 126. The position detection mechanism may consist of the needle bar of a sewing machine which may be positioned over each of the border reference points, or may utilize a laser detector, a mouse detector, a neon pen or other position detection device that will be known to persons of skill in the art. The border reference points may include, for example, the top left fabric article corner 7 and the top right fabric article corner 11, or the top left central zone corner 9 and the top right central zone corner 13. The border reference points may be identified and located by the user on the unsewn fabric article 1 through the interaction of the user with the actuator. As the needle bar is positioned sequentially by the user over these border reference points on the unsewn fabric article 1, or other position detection mechanism is used to detect the position of these border reference points, the border reference points being identified and located on the unsewn fabric article 1 through the interaction of the user with the actuator, the actuator may then scale the border pattern to produce the final border pattern 119 based upon the digitized coordinates for the border reference points. The actuator may then position the sewing machine with respect to the unsewn fabric article 1 in a position to initiate the sewing of the first border zone portion 126 of the fabric article 1.

Through user interaction with the actuator, the sewing start point 131 and the sewing end point 133 on the final border stitching pattern 121 may be selected. The sewing start point 131 and the sewing end point 133 will depend on the sewing frame and the sewing machine being used and the extent to which the fabric article may be sewn from a single position of the fabric article 1 on the sewing frame. FIG. 9 illustrates the final border pattern 119 being divided into four border zone portions 124 at respective border zone portion lines 143. If the inside border line stitching 123 and outside border line stitching 125 are to be sewn, then the actuator may establish an inside border line sewing start point 135, an inside border line sewing end point 137, an outside border line sewing start point 139, and an outside border line sewing end point 141.

Since the size of the fabric article 1 illustrated in FIG. 9 may exceed the size of the sewing frame, the user may reposition the fabric article 1 on the sewing frame one or more times, for the sequential sewing of consecutive border zone portions 124 until the entire final border stitching pattern 121 has been sewn. Each time the fabric article 1 is repositioned for sewing of the final border stitching pattern 121 in a new border zone portion 124, the needle bar may be positioned over the prior sewing begin point 131 and the prior sewing end point 133, or other position detection mechanism may be used to detect the position of the prior sewing begin point 131 and the prior sewing end point 133, for reference in sewing the new border zone portion 124 of the fabric article 1.

The method of the present invention provides for the sewing of the final stitching border pattern 121 in consecutive border zone portions 124. For each border zone portion 124, the fabric of the border zone portion 124 is positioned on the sewing frame, and border zone position data for the border zone portion 124 is detected by a position detection mechanism which is used to detect the position of a plurality of border reference points of the border zone portion 124 and actuator provides for the border reference points to be digitized. The sewing end points 133 are detected by a position detection mechanism for each previously sewed border zone portion 124 which is adjacent to the present border zone portion 124, and those sewing end points 133 are digitized. The border stitching pattern 121 for the present border zone portion 124 is adjusted to fit the sewing start points 131 of the present border zone portion 124 to the sewing end points 133 of the previously sewed border zone portions 124 which are adjacent to the present border zone portion 124. The adjusted border stitching pattern 121 of the border zone portion 124 is then sewed.

Preferred embodiments of the method and apparatus of the present invention may provide for the user to alter or revise border pattern segment 111 selections, respective quantities of selected border pattern segments 111, border pattern segment 111 positioning, pattern segment 111 orientations, scaling of border pattern segments 111, fitting of border pattern segments 111 to border zones 5, and pattern segment interconnections 117 of adjacent border pattern segments 111. Preferred embodiments of the method and apparatus of the present invention may provide for the alterations or revisions of the final border pattern 119 to be made by the user through interaction with the actuator at any time prior to stitching.

Figure 10:
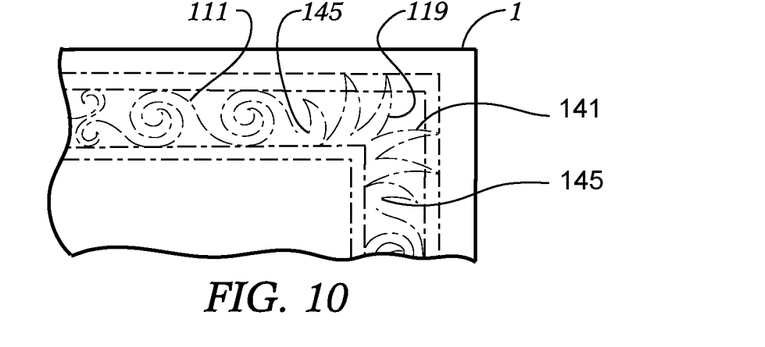
FIG. 10 is a plan view detail of a portion of a border pattern of a fabric article, which is the subject of the method and apparatus of the present invention, showing the border pattern extending outside the outside margin line.
Figure 11:
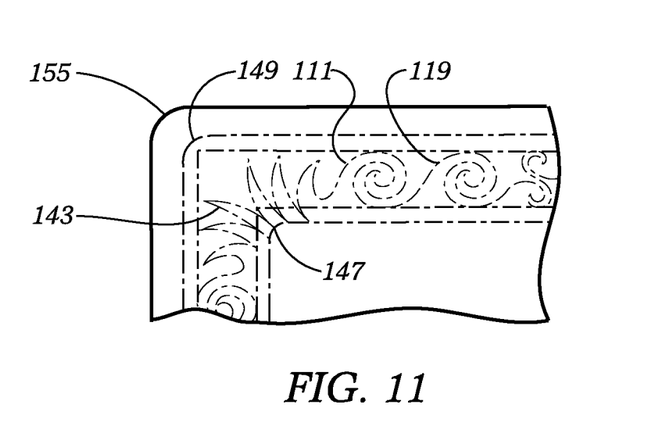
FIG. 11 is a plan view detail of a portion of a border pattern of a fabric article, which is the subject of the method and apparatus of the present invention, showing a border zone with inside margin line and outside margin line rounded at a corner, and showing the border pattern extending inside the inside margin line.

Referring to FIG. 10, a plan view detail of a portion of a border pattern 119 of a fabric article 1 illustrating border pattern segments 111 which include an alternative outside extending pattern segment 141, and alternative pattern discontinuities 145 are shown. Referring also to FIG. 11, a plan view detail of a portion of an alternative border pattern 119 of a fabric article 1 illustrating border pattern segments 111 which include an alternative inside extending pattern segment 143, an alternative rounded inside corner border line 147, an alternative rounded outside corner border line 149, and an alternative rounded fabric article periphery 155, is shown. While preferred embodiments of the method and apparatus of the present invention may provide for the selected and oriented border pattern segments 111 to be scaled and positioned within the border pattern zone 94 and between the outside margin line 82 and the inside margin line 84, other embodiments may provide the user with the option to incorporate one or more outside extending pattern segments 141 or one or more inside extending pattern segments 143, or both, in the final border pattern 119 as shown in FIG. 11. As stated above, the method and apparatus of the present invention may provide for the outside margin line 82 and the inside margin line 84 to strictly define the limits of the selected, positioned, oriented, and scaled border pattern segments 111, or may provide for the outside margin line 82 and the inside margin line 84 to serve as guides or reference lines for use in the selection, positioning, orientation, and scaling of border pattern segments 111.

Referring further also to FIGS. 2-8, although the outside margin line 82 and the inside margin line 84 shown in the drawings are illustrated as straight lines that are uniformly spaced from each other and uniformly spaced from the fabric article periphery 2, the outside border line 8 and the inside border line 3, the method and apparatus of the present invention may provide for the user, through interaction with the actuator, to establish an outside margin line 82 or an inside margin line 84, or both, that vary in position and alignment relative to any or all of the fabric article periphery 2, the outside border line 8 and the inside border line 3. Similarly, the method and apparatus of the present invention may provide for the user, through interaction with the actuator, to establish an outside border line 8 or an inside border line 3, or both, that vary in position and alignment with respect to the fabric article periphery 2.

Figure 12:
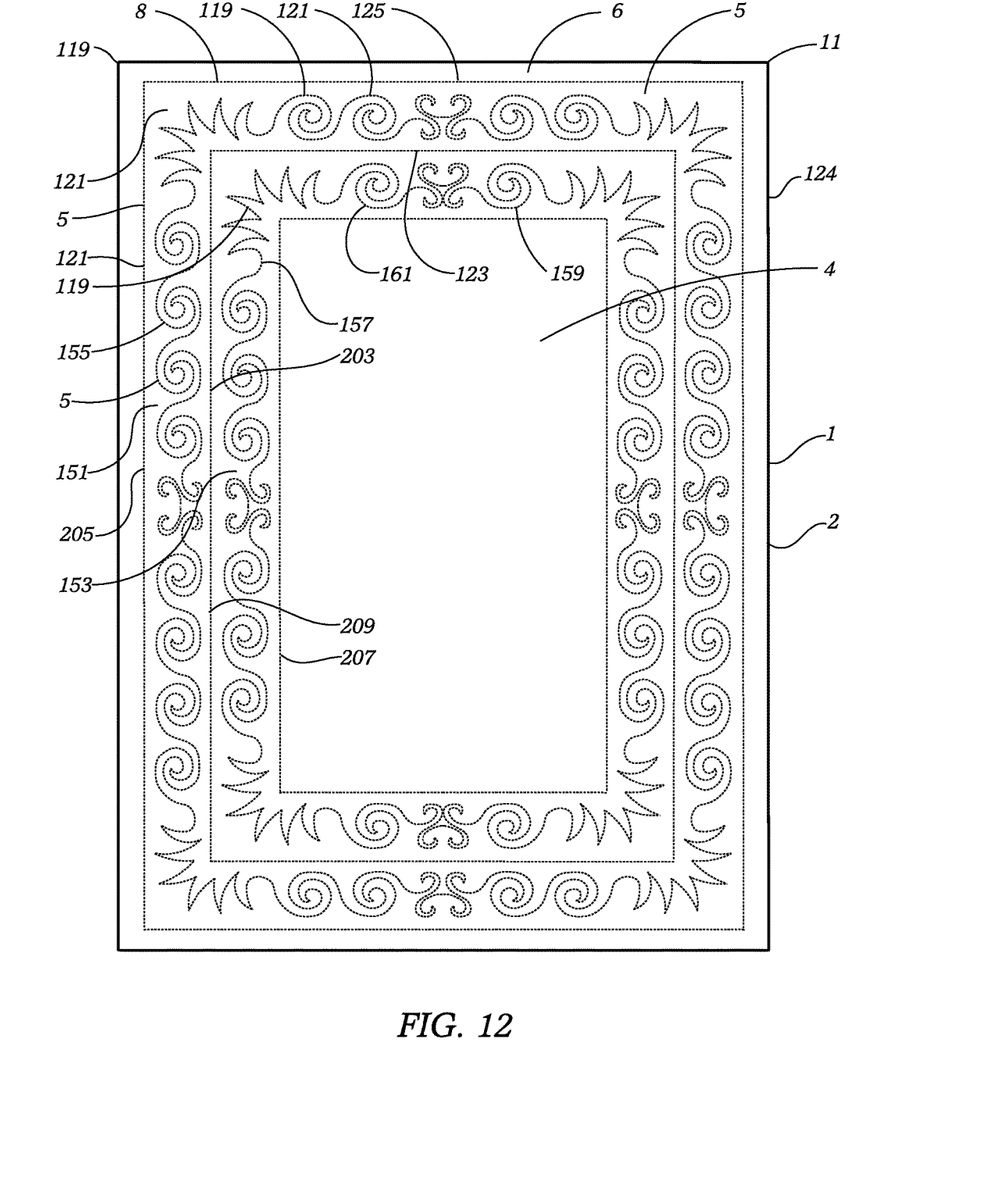
FIG. 12 is a plan view of a pattern of a fabric article, which is the subject of the method and apparatus of the present invention, having two contiguous border zones and two border patterns established by a user using the method and apparatus of the present invention.

Referring now to FIG. 12, an alternative embodiment of a final border pattern 119 and a final border stitching pattern 121 of a fabric article 1 having two contiguous border zones 5, a first border zone 151 and a second border zone 153, having a first final border zone pattern 155 and a second final border zone pattern 157, and having a first final border zone stitching pattern 159 and a second final border zone stitching pattern 161, is shown. Other embodiments of the method and apparatus of the present invention may provide for more than two contiguous border zones 5. Further embodiments of the method and apparatus of the present invention may provide for two or more border zones 5 that are not contiguous, the first border zone inside boundary line 203 not being aligned with and not being adjacent to the second border zone outside boundary line 205. For these further embodiments, the two or more border zones 5 may be spaced apart along all or a portion of the proximal boundary lines or may overlap along all or a portion of the proximal boundary lines. These further embodiments of the method and apparatus of the present invention provide for each respective border zone 5 of the two or more border zones 5 to be independently positioned, with respect to the fabric article periphery 2, by the user through interaction with the actuator, and for the independent selection, quantity determination, positioning, orientation, sizing and interconnection of border pattern segments 111, for each of the respective border zones 5, by the user through interaction with the actuator.

Figure 13:
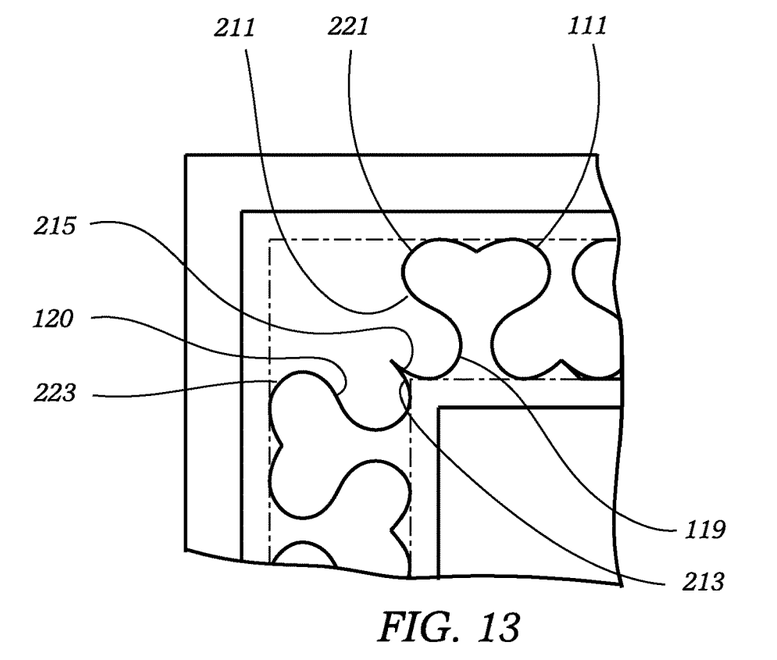
FIG. 13 is a plan view detail of a corner portion of a border pattern of a fabric article, which is the subject of the method and apparatus of the present invention, showing an alternative for mitering the border pattern segments at a corner.
Figure 14:
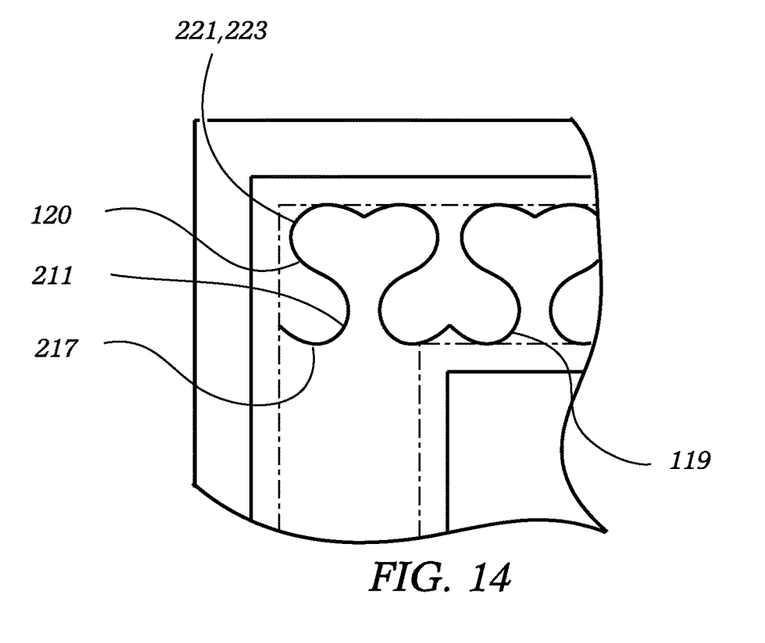
FIG. 14 is a plan view detail of a corner portion of a border pattern of a fabric article, which is the subject of the method and apparatus of the present invention, showing an alternative for terminating the border pattern at a corner.

Referring now to FIGS. 13-14, illustrations of alternatives for the corner pattern section 211 of the final border pattern 119 other than the use of a border pattern segment 111 that is specifically adapted for use as corner pattern segments 120 as shown in FIG. 3. FIG. 13 illustrates the use of a corner miter pattern 213. The user may elect, through interaction with the actuator, to utilize a corner miter pattern 213 for one or more of the border pattern corners 215 at the junction of a border pattern top section 221 and a border patter side section 223. The actuator may then display alternatives for the corner miter pattern 213, and the user may select a preferred corner miter pattern 213. FIG. 14 illustrates the use of a terminated border pattern section 217, which may be a border pattern top section 221 or a border pattern side section 223. If the terminated border pattern section 217 is a border pattern top section 221, the final border pattern 119 does not continue to the adjacent side portion of the fabric article 1. If the terminated border pattern section 217 is a border pattern side section 223, the final border pattern 119 does not continue to the adjacent top portion of the fabric article 1.

The method and apparatus of the present invention for generating a border pattern is particularly well suited for a quilt. However, the method and apparatus may be utilized equally well for generating a border pattern for other fabric articles such as an embroidery article, which may incorporate a single or multiple fabric layers.

Methods for keying the final border stitching pattern 121 to the unsewn fabric article 1, including manually positioning the needle bar or utilizing other position detection mechanisms as described above, will be known to persons skilled in the art. The method and apparatus of U.S. Pat. No. 8,515,571 to Bagley for A Method and Apparatus for Automated Segmental Sewing of Over-Sized Sewing Pattern, which is assigned to the assignee of the present invention, may be adapted for the segmental sewing of the final border stitching pattern 121 of the method and apparatus of the present invention.

In the following claims, the terms "selecting", "select", and "selected", when used in relation to the terms "border pattern segments" or "pattern segments", shall be defined to include the determination of the respective quantities of each of the border pattern segments selected by the user for inclusion in the border pattern.

In view of the disclosures of this specification and the drawings, other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. A method for automated assisted generation, by a user, of a digitized border pattern for a border zone of a fabric article, and automated assisted sewing of the digitized border pattern using a sewing frame, the sewing frame having a fabric positioning mechanism and a sewing machine positioning mechanism, the sewing machine positioning mechanism being controlled by an actuator and providing for two dimensional positioning of a sewing machine with respect to the sewing frame, the border pattern being comprised of a plurality of border pattern segments having one or more pattern lines, the method comprising:

inputting, by the user to the actuator of fabric article data;
determining, by the actuator based upon the fabric article data, of digitized fabric article coordinates;
displaying the border zone to the user by the actuator;
presenting available digitized border pattern segments to the user by the actuator;

selecting, positioning, orienting, and scaling of border pattern segments with respect to the displayed border zone, by the user through interaction of the user with the actuator, for integration of the selected border pattern segments into the digitized border pattern;

performing, by the actuator, of a pattern segment analysis for determining respective pattern segment interconnection options for interconnecting one or more sets of adjacent selected border pattern segments, which pattern segment interconnection options may include options for truncating pattern segment end lines, to form a border pattern for the border zone which is continuous between the interconnected sets of adjacent selected border pattern segments, and displaying the interconnection options to the user;

selecting, by the user through interaction of the user with the actuator, of preferred interconnection options, if any of the interconnection options are desired by the user;

generating and displaying, by the actuator, a selected border pattern from the selected, positioned, oriented, and scaled border pattern segments, including any interconnected border pattern segments; and sewing, by the user through use of the actuator, of the selected border pattern.

2. A method for automated assisted generation, by a user, of a digitized border pattern for a border zone of a fabric article, and automated assisted sewing of the digitized border pattern using a sewing frame, the sewing frame having a fabric positioning mechanism and a sewing machine positioning mechanism, the sewing machine positioning mechanism being controlled by an actuator and providing for two dimensional positioning of a sewing machine with respect to the sewing frame, the border pattern being comprised of a plurality of border pattern segments having one or more pattern lines, the method comprising:

inputting, by the user to the actuator as prompted by the actuator, of fabric article data;

determining, by the actuator based upon the fabric article data, of digitized fabric article coordinates;

displaying the border zone to the user by the actuator;

presenting available digitized border pattern segments to the user by the actuator;

selecting, positioning, orienting, and scaling of border pattern segments with respect to the displayed border zone, by the user through interaction of the user with the actuator, for integration of the selected border pattern segments into the digitized border pattern;

performing, by the actuator, of a pattern segment analysis for determining respective pattern segment interconnection options for interconnecting one or more sets of adjacent selected border pattern segments, which pattern segment interconnection options may include options for truncating pattern segment end lines, to form a border pattern for the border zone which is continuous between the interconnected sets of adjacent selected border pattern segments, and displaying the interconnection options to the user;

selecting, by the user through interaction of the user with the actuator, of preferred interconnection options, if any of the interconnection options are desired by the user;

generating and displaying, by the actuator, a selected border pattern from the selected, positioned, oriented, and scaled border pattern segments, including any interconnected border pattern segments; and sewing, by the user through use of the actuator, of the selected border pattern in consecutive border zone portions consistent with one or more size limitations of the fabric positioning mechanism and one or more sewing machine positioning capabilities of the sewing machine positioning mechanism.

3. The method of claim 2 wherein sewing the selected border pattern in consecutive border zone portions comprises, for each respective border zone portion:

positioning the fabric on the fabric positioning mechanism for the border zone portion of the border pattern to be sewed;

inputting and digitizing a plurality of border reference points for the border zone portion;

inputting each sewing end point for each previously sewed border zone portion, if any, which is adjacent to the border zone portion and digitizing each such sewing end point;

adjusting the pattern lines of the border zone portion of the border pattern to be sewed to fit the digitized sewing end points;

sewing the adjusted pattern lines of the border zone portion;

repeating the foregoing for each border zone portion, beginning with positioning the fabric on the fabric positioning mechanism for the border zone portion of the border pattern to be sewed, until all of the border pattern is sewed.

4. The method of claim 2 wherein sewing the selected border pattern in consecutive border zone portions comprises, for each respective border zone portion:

positioning the fabric on the fabric positioning mechanism for the border zone portion of the border pattern to be sewed;

inputting and digitizing a plurality of border reference points of the border zone portion, using a position detection mechanism to detect a respective position of each of the plurality of border reference points of the border zone portion and digitizing each such border reference point;

inputting each sewing end point for each previously sewed border zone portion, if any, which is adjacent to the border zone portion and digitizing each such sewing end point, by using a position detection mechanism to detect a respective position of each of the sewing end points, and digitizing each such sewing end point;

adjusting the pattern lines of the border zone portion of the border pattern to be sewed to fit the digitized sewing end points;

sewing the adjusted pattern lines of the border zone portion;

repeating the foregoing for each border zone portion, beginning with positioning the fabric on the fabric positioning mechanism for the border zone portion of the border pattern to be sewed, until all of the border pattern is sewed.

5. A method for automated assisted generation, by a user, of a digitized border pattern for a border zone of a fabric article, the border pattern being comprised of a plurality of border pattern segments having one or more pattern lines, the method comprising:

inputting, by the user to the actuator as prompted by the actuator, of fabric article data;

determining, by the actuator based upon the fabric article data, of digitized fabric article coordinates;

displaying the border zone to the user by the actuator;

presenting available digitized border pattern segments to the user by the actuator;

selecting, positioning, orienting, and scaling of border pattern segments with respect to the displayed border zone, by the user through interaction of the user with the actuator, for integration of the selected border segments into the digitized border pattern;

performing, by the actuator, of a pattern segment analysis for determining respective pattern segment interconnection options for interconnecting one or more sets of adjacent selected border pattern segments with pattern segment interconnections, which pattern segment interconnection options may include options for truncating pattern segment end lines, to form a border pattern for the border zone which is continuous between the interconnected sets of adjacent selected border pattern segments, and displaying the interconnection options to the user;

selecting, by the user through interaction of the user with the actuator, of preferred interconnection options, if any of the interconnection options are desired by the user; and generating and displaying, by the actuator, a selected border pattern from the selected, positioned, oriented, and scaled border pattern segments, including any interconnected border pattern segments.

6. The method of claim 5 wherein the plurality of selected, positioned, oriented, and scaled border pattern segments are interconnected by the selected pattern segment interconnections to form a continuous border pattern.

7. The method of claim 5 wherein the border zone is defined by a plurality of digital border reference points which are generated by the actuator based upon input from the user using a position detection mechanism to detect a respective position of each of the plurality of border reference points of the border zone.

8. The method of claim 5 wherein the border zone is defined by an inside border line and an outside border line, and wherein an inside margin line, which is outside the inside border line and an outside margin line, which is inside the outside border line, serve as boundaries or guides for the positioning and scaling of the selected border pattern segments.

9. The method of claim 5 wherein the fabric article has a fabric article periphery and the border zone is defined by an inside border line and an outside border line and one or both of the inside border line and the outside border line vary in distance from the fabric article periphery.

10. The method of claim 5 wherein the pattern segment interconnection options are adjustable curves of varying curvature.

11. The method of claim 5 wherein generating interconnection options includes generating optional pattern segment interconnections which may include truncating end lines of one or more of the respective adjacent border pattern segments for which interconnection is being considered by the user.

12. The method of claim 5 wherein generating interconnection options includes generating optional pattern segment interconnections which may include truncating end lines of one or more of the respective adjacent border pattern segments and which may include incorporating splines to provide smooth, continuous connections of the patterns.

13. The method of claim 5 wherein the border pattern may be adjusted by the user, through interaction with the actuator, based upon input from the user using a position detection mechanism to detect a respective position of one or more reference points on the fabric article.

14. The method of claim 5 wherein the fabric article has a plurality of border zones and the border pattern comprises a plurality of border zone patterns, each border zone having a respective border zone pattern.

15. An apparatus for automated assisted generation, by a user, of a digitized border pattern for a border zone of a fabric article, and automated assisted sewing of the digitized border pattern, the border pattern being comprised of a plurality of border pattern segments having one or more pattern lines, the apparatus comprising:

a sewing frame, the sewing frame having a fabric positioning mechanism and a sewing machine positioning mechanism;

an actuator having a capability for receiving an input by the user of fabric article data, a capability, based upon the fabric article data, for determining digitized fabric article coordinates, a capability of displaying the border zone to the user, a capability for presenting available digitized border pattern segments to the user, a capability for selecting, positioning, orienting, and scaling of border pattern segments with respect to the displayed border zone, by the user through interaction of the user with the actuator, for integration of the selected border pattern segments into the digitized border pattern, a capability for performing of a pattern segment analysis for determining respective pattern segment interconnection options for interconnecting one or more sets of adjacent selected border pattern segments, which pattern segment interconnection options may include options for truncating pattern segment end lines, to form a border pattern for the border zone which is continuous between the interconnected sets of adjacent selected border pattern segments, and displaying the interconnection options to the user, a capability for selection, by the user through interaction of the user with the actuator, of preferred interconnection options, if any of the interconnection options are desired by the user, a capability for generating and displaying to the user of a selected border pattern from the selected, positioned, oriented, and scaled border pattern segments, including any interconnected border pattern segments, a capability for controlling the sewing machine positioning mechanism and providing for two dimensional positioning of a sewing machine with respect to the sewing frame, and a capability for sewing, by the user through use of the actuator, of the selected border pattern.

16. An apparatus for automated assisted generation, by a user, of a digitized border pattern for a border zone of a fabric article, and automated assisted sewing of the digitized border pattern, the border pattern being comprised of a plurality of border pattern segments having one or more pattern lines, the apparatus comprising:

a sewing frame, the sewing frame having a fabric positioning mechanism and a sewing machine positioning mechanism;

an actuator having a capability for receiving an input by the user of fabric article data, a capability, based upon the fabric article data, for determining digitized fabric article coordinates, a capability of displaying the border zone to the user, a capability for presenting available digitized border pattern segments to the user, a capability for selecting, positioning, orienting, and scaling of border pattern segments with respect to the displayed border zone, by the user through interaction of the user with the actuator, for integration of the selected border pattern segments into the digitized border pattern, a capability for performing of a pattern segment analysis for determining respective pattern segment interconnection options for interconnecting one or more sets of adjacent selected border pattern segments, which pattern segment interconnection options may include options for truncating pattern segment end lines, to form a border pattern for the border zone which is continuous between the interconnected sets of adjacent selected border pattern segments, and displaying the interconnection options to the user, a capability for selection, by the user through interaction of the user with the actuator, of preferred interconnection options, if any of the interconnection options are desired by the user, a capability for generating and displaying to the user of a selected border pattern from the selected, positioned, oriented, and scaled border pattern segments, including any interconnected border pattern segments, a capability for controlling the sewing machine positioning mechanism and providing for two dimensional positioning of a sewing machine with respect to the sewing frame, and a capability for sewing, by the user through use of the actuator, of the selected border pattern in consecutive border zone portions consistent with one or more size limitations of the fabric positioning mechanism and one or more sewing machine positioning capabilities of the sewing machine positioning mechanism.

17. An apparatus for automated assisted generation, by a user, of a digitized border pattern for a border zone of a fabric article, the border pattern being comprised of a plurality of border pattern segments having one or more pattern lines, the apparatus comprising an actuator having capabilities for:

receiving an input by the user of fabric article data;

determining digitized fabric article coordinates based upon the fabric article data;

displaying the border zone to the user;

presenting available digitized border pattern segments to the user;

selecting, positioning, orienting, and scaling of border pattern segments with respect to the displayed border zone, by the user through interaction of the user with the actuator, for integration of the selected border pattern segments into the digitized border pattern;

performing of a pattern segment analysis for determining respective pattern segment interconnection options for interconnecting one or more sets of adjacent selected border pattern segments, which pattern segment interconnection options may include options for truncating pattern segment end lines, to form a border pattern for the border zone which is continuous between the interconnected sets of adjacent selected border pattern segments, and displaying the interconnection options to the user, selection, by the user through interaction of the user with the actuator, of preferred interconnection options, if any of the interconnection options are desired by the user; and generating and displaying to the user of a selected border pattern from the selected, positioned, oriented, and scaled border pattern segments, including any interconnected border pattern segments.

* * * * *